United States Patent [19]

Yang

[11] Patent Number: 5,230,232
[45] Date of Patent: Jul. 27, 1993

[54] STEERING WHEEL LOCK

[76] Inventor: Paul Yang, P.O. Box 82-144, Taipei, Taiwan

[21] Appl. No.: 843,355

[22] Filed: Feb. 27, 1992

[51] Int. Cl.⁵ .......................................... B60R 25/02
[52] U.S. Cl. ...................................... 70/209; 70/226; 70/238
[58] Field of Search ................. 70/198, 199, 209-212, 70/225, 226, 237, 238

[56] References Cited

U.S. PATENT DOCUMENTS

| | | | |
|---|---|---|---|
| 1,165,776 | 12/1915 | Harding | 70/199 |
| 1,579,395 | 4/1926 | Rohm et al. | 70/199 |
| 3,828,593 | 8/1974 | Bolton | 70/209 |
| 4,317,346 | 3/1982 | Gutman | 70/238 |
| 4,829,797 | 5/1989 | Wu | 70/226 X |
| 4,848,110 | 7/1989 | Kuo | 70/238 X |
| 5,038,667 | 8/1991 | Slater | 70/238 X |
| 5,042,278 | 8/1991 | Wang | 70/226 X |
| 5,055,823 | 10/1991 | Fuller | 70/225 X |
| 5,092,146 | 3/1992 | Wang | 70/226 X |
| 5,128,649 | 7/1992 | Elmer | 70/226 X |
| 5,129,245 | 7/1992 | Chang | 70/209 |

FOREIGN PATENT DOCUMENTS

| | | | |
|---|---|---|---|
| 631708 | 6/1936 | Fed. Rep. of Germany | 70/209 |
| 668492 | 10/1964 | Italy | 70/209 |
| 2063194 | 6/1981 | United Kingdom | 70/238 |
| 2142889 | 1/1985 | United Kingdom | 70/198 |

Primary Examiner—Peter M. Cuomo
Assistant Examiner—Suzanne L. Dino
Attorney, Agent, or Firm—Alfred Lei

[57] ABSTRACT

This contrivance relates to a steering wheel lock and in particular to one including a female member provided with a stopper at one end, a plurality of notches at an intermediate portion, and a lock core at the other end, a male member fitted into the female member and having a plurality of notches opposite to the notches of the female member, a latch formed with a protuberance at both sides of its one end and a plurality of holes along its length and inserted into the male member until the latch is in contact with the stopper of the female member, and a ferrule engaged with the other end of the latch and kept in fixed position by a pin so that the latch may be pulled outwards until the protuberance of the latch is in contact with the ferrule thereby preventing the latch from detaching from the male member.

1 Claim, 7 Drawing Sheets

STEERING WHEEL LOCK

BACKGROUND OF THE INVENTION

Referring to FIG. 8, there is shown an exploded view of a prior art lock for the steering wheel of an automobile. As illustrated, the lock is composed of a body portion 9, a fixed latch 90 and a movable latch 91. The body portion 9 is provided with a seat 93 for receiving a core 98. The fixed latch 90 is fixedly connected with the rear end of the body portion 9 and has a hook 94 at the intermediate portion and a handle 95 at the rear end. The movable latch 91 may be inserted into a hole 92 of the body portion 9 at one end and has a hook 97 at the other. When the core 98 is turned by a correct key, an actuating element 99 will engage the groove 96 of the movable latch 91 so that the hooks 97 and 94 may bear against the steering wheel thus limiting the rotating angle of the steering wheel.

However, the resilient means urging against the actuating element 99 will become fatigue after a certain period of time so that the movable latch 91 may be pulled out when applied by a strong force. Further, the lock is rather long in length hence making it difficult to be stowed when not in use.

Therefore, it is an object of the present invention to provide a lock for the steering wheel of an automobile which may obviate and mitigate the above-mentioned drawbacks.

SUMMARY OF THE INVENTION

This invention relates to an improved steering wheel lock.

It is the primary object of the present invention to provide a steering wheel lock which may be adapted for use with steering wheels of various sizes.

It is another object of the present invention to provide a steering wheel lock which will engage with the steering wheel lock when locked so that it is necessary to break the steering wheel if the thief wants to destroy the lock thereby making it impossible to drive the automobile away without permission.

It is still another object of the present invention to provide a steering wheel lock which can be easily stowed when not in use.

It is still another object of the present invention to provide a steering wheel lock which is inexpensive to manufacture.

It is a further object of the present invention to provide a steering wheel lock which is simple in construction.

Other objects and merits and a fuller understanding of the present invention will be obtained by those having ordinary skill in the art when the following detailed description is read in conjunction with the accompanying drawings.

DETAILED DESCRIPTION OF THE PREFERRED EMBODIMENT

Before explaining the present invention in detail, it is understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
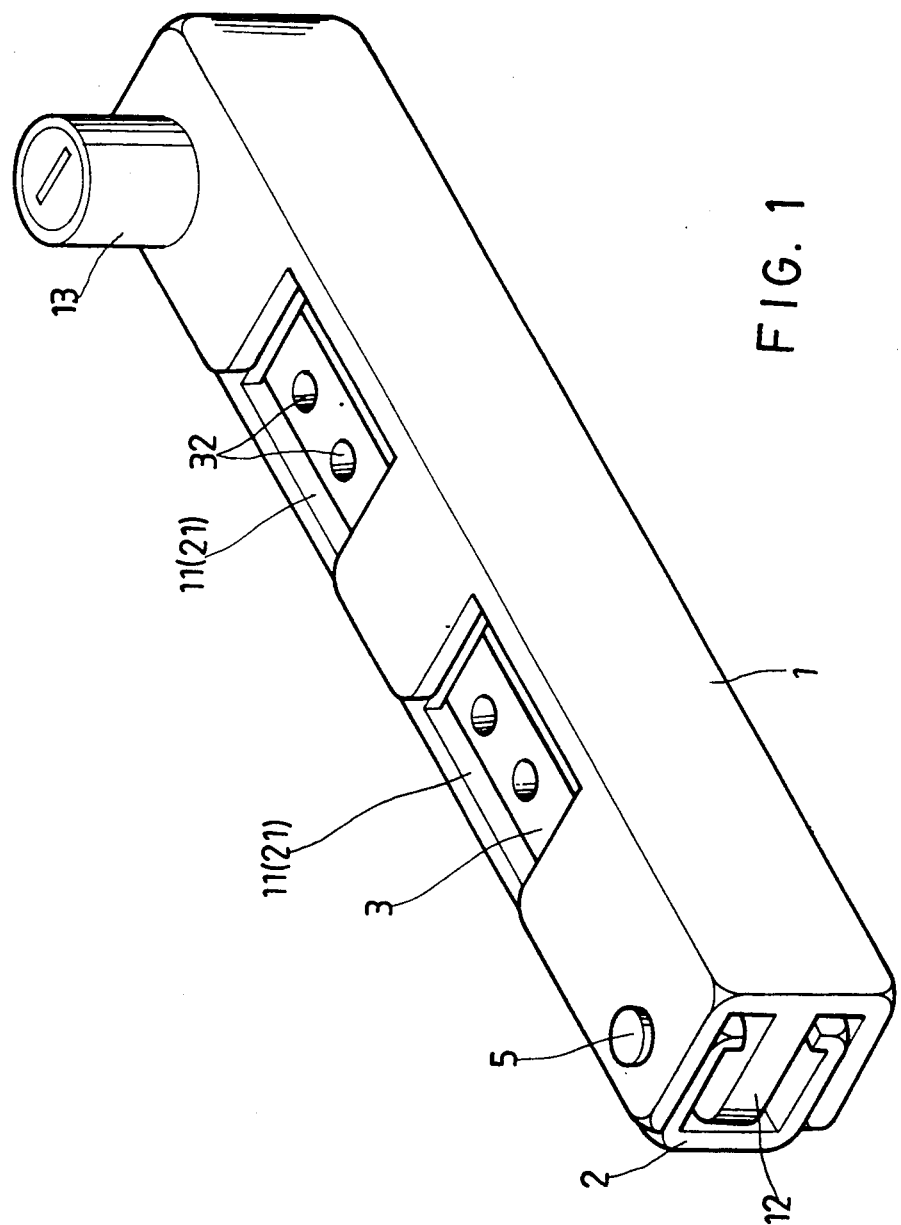
FIG. 1 is a perspective view of the present invention.
Figure 2:
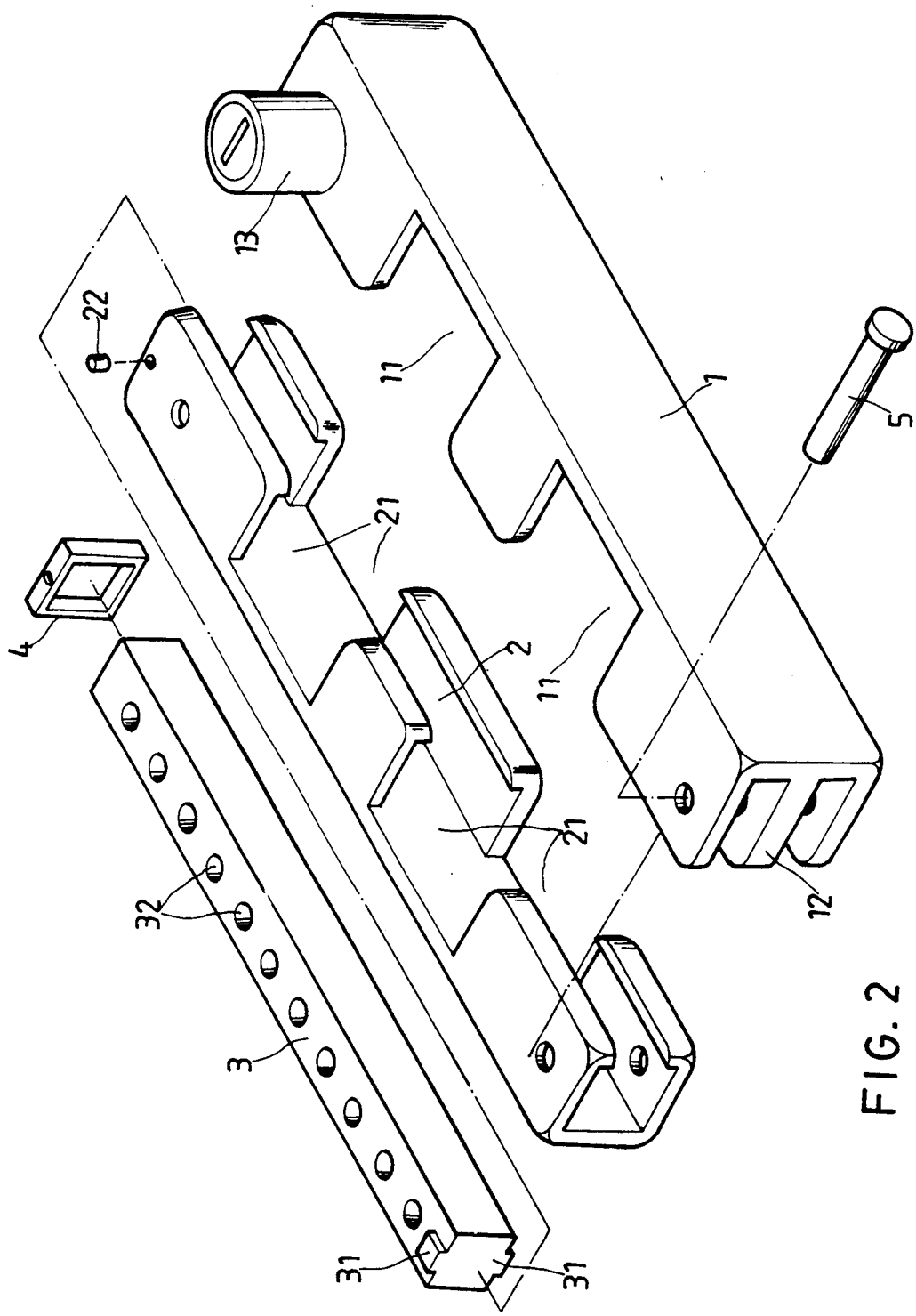
FIG. 2 is an exploded view of the present invention.
Figure 3:
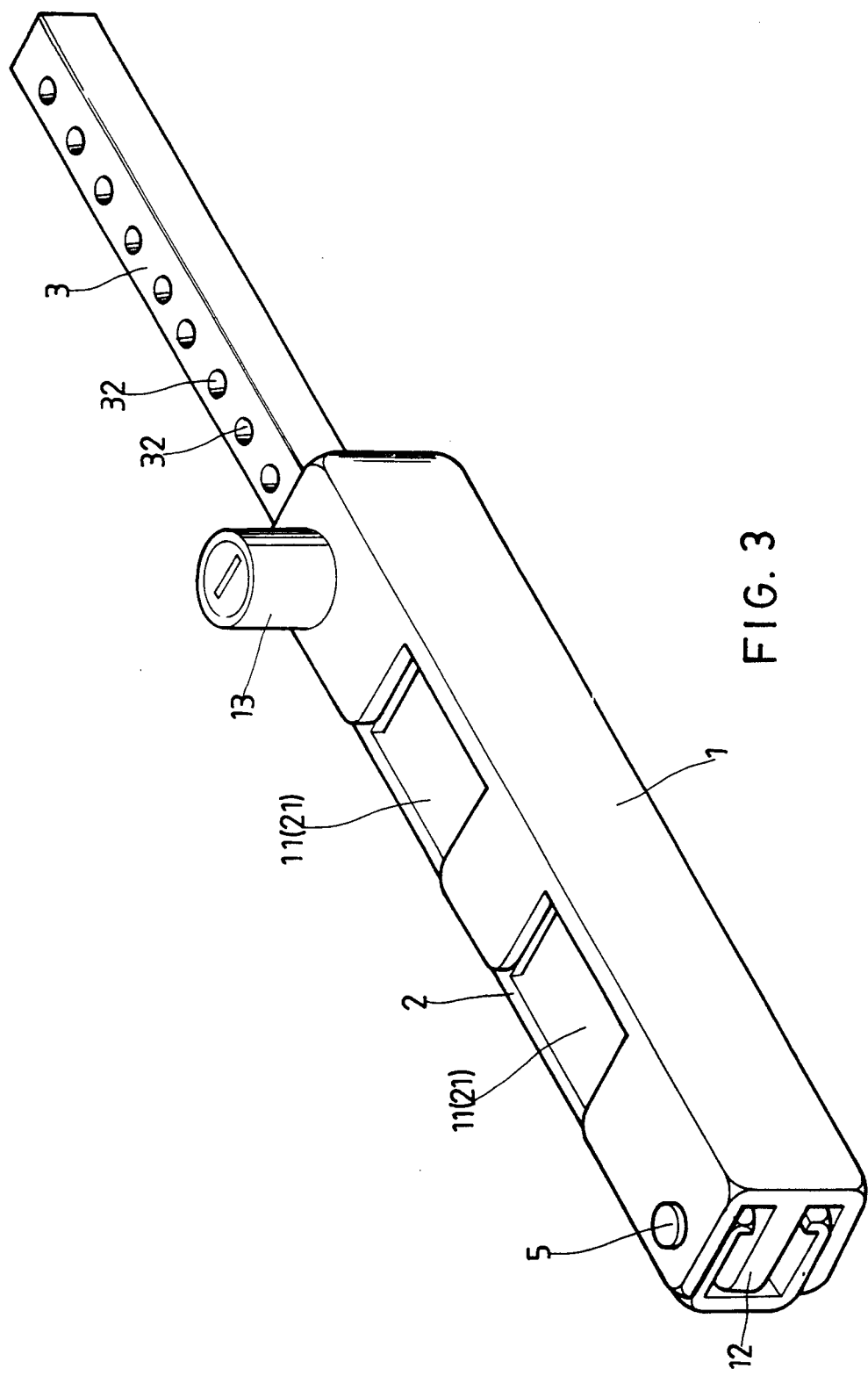
FIG. 3 shows the latch being located at an extended position.
Figure 4:
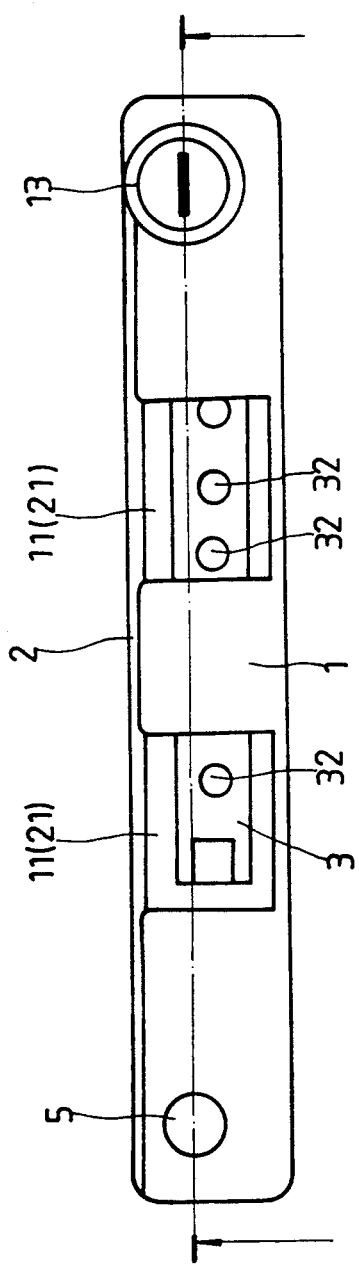
FIG. 4 is a top plan view of the present invention.
Figure 5:
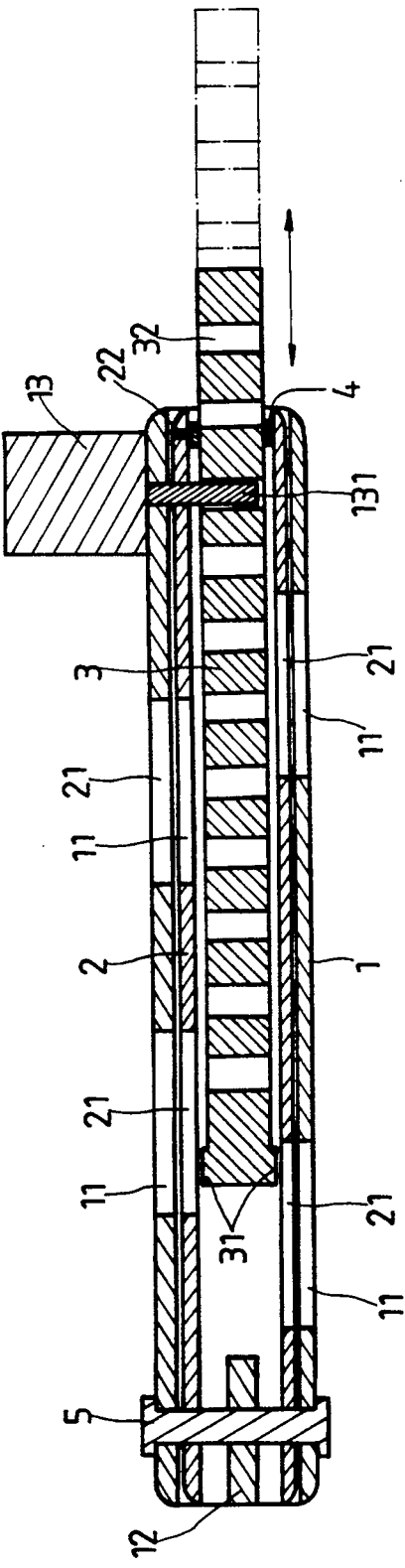
FIG. 5 is a sectional view of the present invention.
Figure 6:
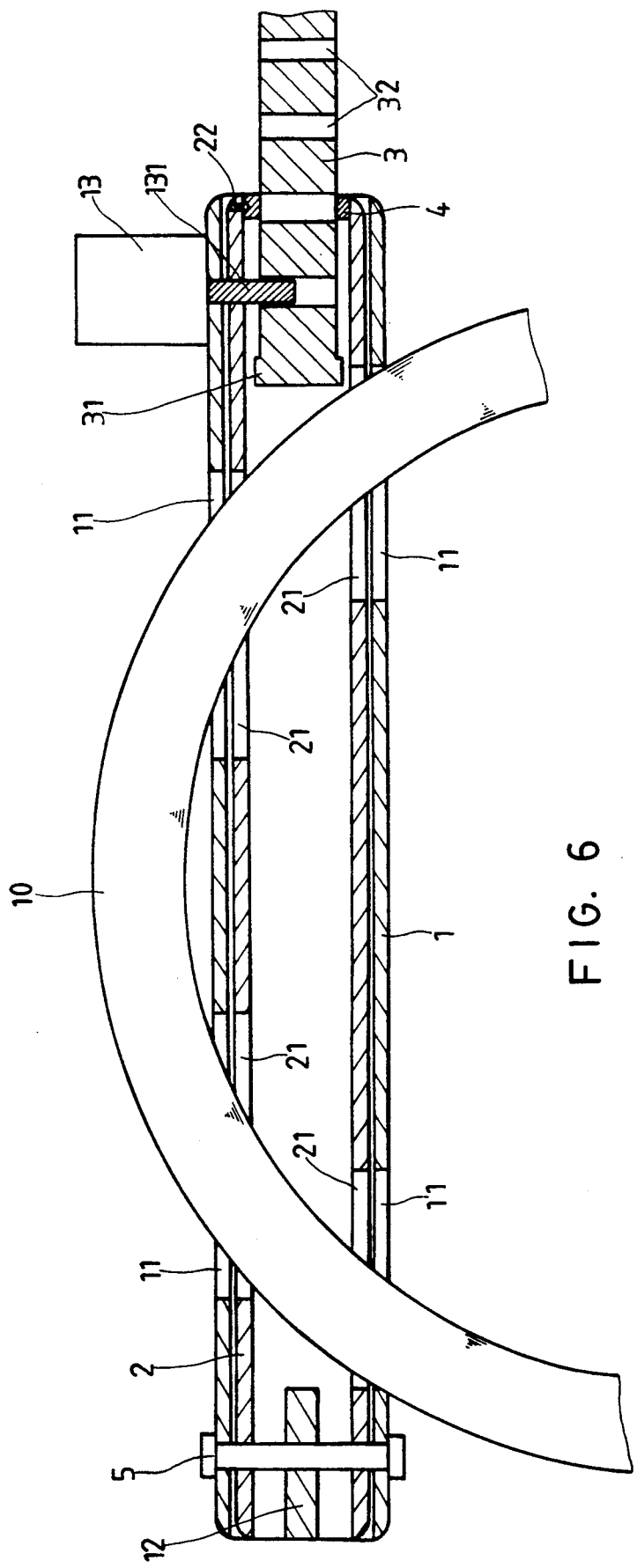
FIGS. 6 and 7 are working views of the present invention.
Figure 7:
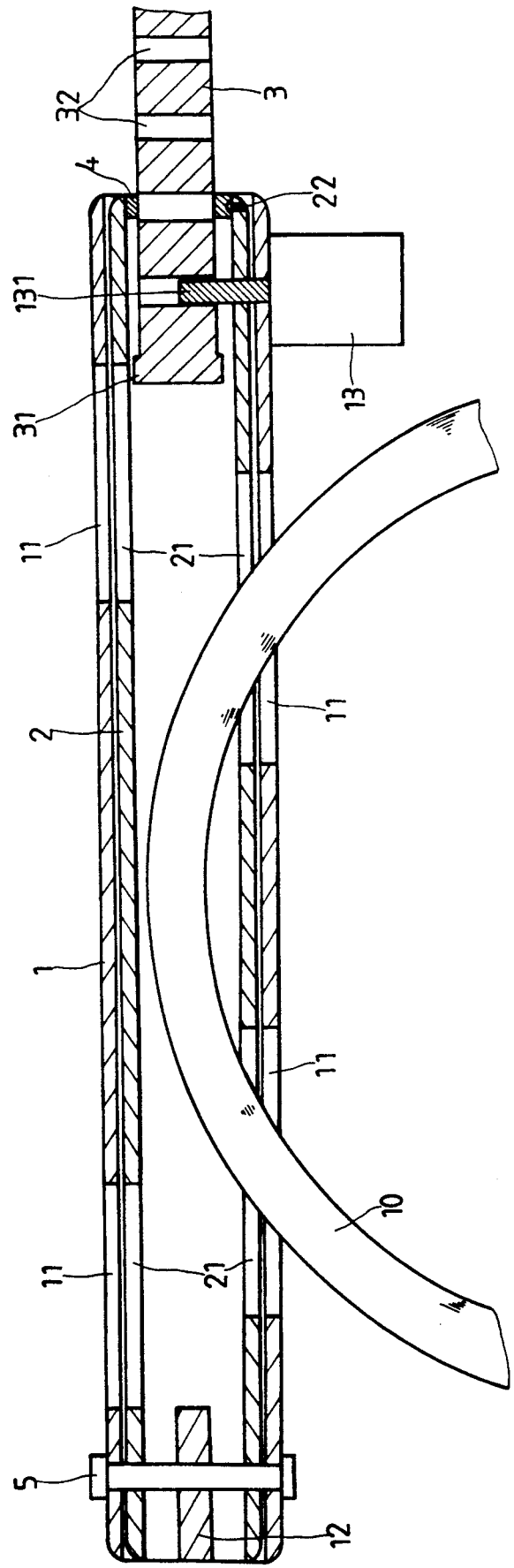
Figure 8:
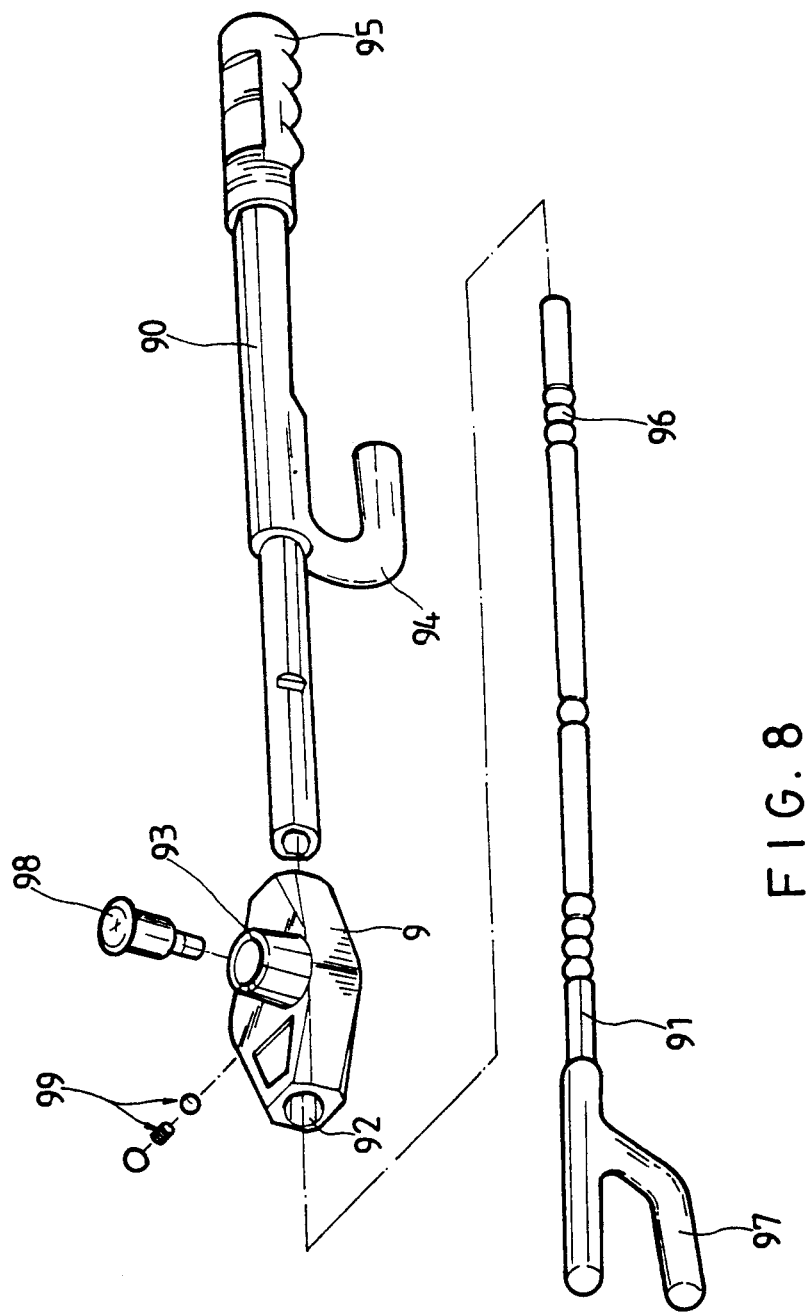
FIG. 8 is an exploded view of a prior art steering wheel lock.

With reference to the drawings and in particular to FIGS. 1 and 2 thereof, the steering wheel lock according to the present invention mainly comprises a female member 1, a male member 2, a latch 3 and a ferrule 4.

As illustrated, the female member 1 is provided with a stopper 12 at one end, a plurality of notches 11 at the intermediate portion, and a lock core 13 at the other end.

The male member 2 is fitted into the female member 1 and has a plurality of notches 21 opposite to the notches 11 of the female member 1. Further, one end of the male member 2 is pivotally connected with an end of the female member 1 by a pin 5.

The latch 3 is formed with a protuberance 31 at both sides of its one end and a plurality of holes 32 along its length and inserted into the male member until it is in contact with the stopper 12 of the female member 1.

The ferrule 4 is engaged with the other end of the latch 3 and kept in fixed position by a pin 22 so that the latch 3 may be pulled outwards until its protuberances 31 are in contact with the ferrule 4 thereby preventing the latch 3 detaching from the male member 2.

When in use, simply use the correct key to turn the lock core 13 so as to separate the locking pin 131 from the hole 32 of the latch 3 and the male member 2. Then, turn the male member 2 away the female member 1 with respect to the pin 5. Thereafter, pull out the latch 3 and engage a portion of the steering wheel 10 between the male member 2 and the female member 1. Finally, turn the lock core 13 to engage the locking pin 131 with a hole 32 of the latch 3 so that the latch 3 will limit the rotating range of the steering wheel and therefore, preventing the the automobile from being stolen.

Although the present invention has been described with a certain degree of particularly, it is understood that the present disclosure is made by way of example only and that numerous changes in the detail of construction and the combination and arrangement of parts may be resorted to without departing from the spirit and scope of the invention as hereinafter claimed.

I claim:
1. A steering wheel lock comprising:
a female member, having a longitudinal axis, with a stopper at a first end, a plurality of notches at an intermediate portion, and a lock core at a second end;
a male member, having a longitudinal axis, fitted into said female member and having a plurality of notches opposite to the notches of said female member, one end of said male member being pivotally connected with the first end of said female member;
a latch bar, having a longitudinal axis, formed with two diametrically opposed protuberances at a first end thereof and a plurality of holes along a length thereof and inserted into said male member until said first end of said latch bar is in contact with said stopper of said female member;

a ferrule engaged with a second end of said latch bar and kept in a fixed position by a pin on said male member so that said latch bar may be pulled outwards of said male member, along said longitudinal axis, until said protuberances of said latch bar are in contact with said ferrule thereby preventing said latch bar from detaching from said male member; and wherein said male member pivots into said female member to capture therebetween, within said plurality of notches, a steering wheel and is locked in a clamped position by moving said latch bar, along said longitudinal axis, until one of said plurality of holes aligns with said lock core on said female member.

* * * * *